United States Patent

[11] 3,582,085

[72] Inventor Gordon H. Buck
Torrance, Calif.
[21] Appl. No. 804,491
[22] Filed Mar. 5, 1969
[45] Patented June 1, 1971
[73] Assignee Mattel, Inc.
Hawthorne, Calif.

[54] SOUND-TRANSLATING APPARATUS
13 Claims, 9 Drawing Figs.

[52] U.S. Cl. .......... 274/11A, 274/1A
[51] Int. Cl. .......... G11b 25/06
[50] Field of Search .......... 274/1.1, 11, 14, 15

[56] References Cited

UNITED STATES PATENTS 3,282,588 11/1966 Ashmele .......... 274/1
3,482,842 12/1969 Danielsen et al. .......... 274/1

*Primary Examiner*—Leonard Forman
*Assistant Examiner*—Steven L. Stephan
*Attorney*—Seymour A. Scholnick ABSTRACT: A continuous loop tape has a plurality of sound sequences in prerecorded phonograph record grooves terminating in a single runout groove. Sound-reproducing means include a tone arm having phonograph needle engageable with the grooves as said tape is advanced. An indexing wheel driven in timed relation to the tape has a cam segment and can be rotated to a selected position which locates the cam segment a given circumferential distance from a lever engaging the tone arm. When the tape starts the indexing wheel turns and, as the cam segment engages the lever, the tone arm is lifted and dropped in an area on the tape corresponding to the desired groove. The indexing wheel then ceases to turn so as not to continually lift the tone arm during play.

INVENTOR
GORDON H. BUCK

BY Max E. Shirk
ATTORNEY

INVENTOR
GORDON H. BUCK

BY Max E. Shirk
ATTORNEY

SOUND-TRANSLATING APPARATUS

BACKGROUND OF THE INVENTION

The present invention relates to a new and useful electrically operated sound-translating device having sound-reproducing means which may be conditioned by a user of the device to reproduce predetermined segments of recorded information from a continuous loop tape. The device is generally similar to a random tape sound device disclosed in a copending application, the disclosure of which is hereby incorporated herein by reference, Ser. No. 699,653 filed Jan. 22, 1968, now Pat. No. 3,482,842 and assigned to the assignee of the instant application. However, the device in said copending application included a random sound-selecting system and the instant device includes an indexing sound-selecting system.

It is accordingly an object of this invention to provide a new and improved sound-translating apparatus having a continuous loop tape.

It is another object of this invention to provide a new and improved sound-translating apparatus having a unique tape indexing mechanism.

It is a further object of this invention to provide a new and improved electrically operated sound-translating apparatus having a tape groove carrying a tone arm along a predetermined terminal path to operate switching means controlling a motor.

SUMMARY OF THE INVENTION

The foregoing and other objects of the invention are accomplished by providing an endless loop tape having a plurality of prerecorded phonograph record grooves positioned in parallel configuration along the length thereof, the grooves terminating in a single runout groove following a predetermined path from one edge of the tape laterally across the width of the tape to the other edge. A tone arm having a needle engaging the runout groove traverses the width of the tape to actuate a switch controlling the electrical driving means. Indexing is accomplished by an indexing wheel having a cam segment displaceable a predetermined circumferential distance from a lever engaging the tone arm. Energization of the motor by a momentary switch in parallel with the first switch starts the tape moving and the index wheel turning until the cam segment engages the lever to lift the tone arm and drop it in the selected groove at a predetermined area on the tape.

BRIEF DESCRIPTION OF THE DRAWINGS

Further objects, features and advantages of the invention will be pointed out with particularity in the following description when taken in conjunction with the drawings in which.

DESCRIPTION OF THE PREFERRED EMBODIMENT

Figures 1, 3, 3A, 3B, 3C:
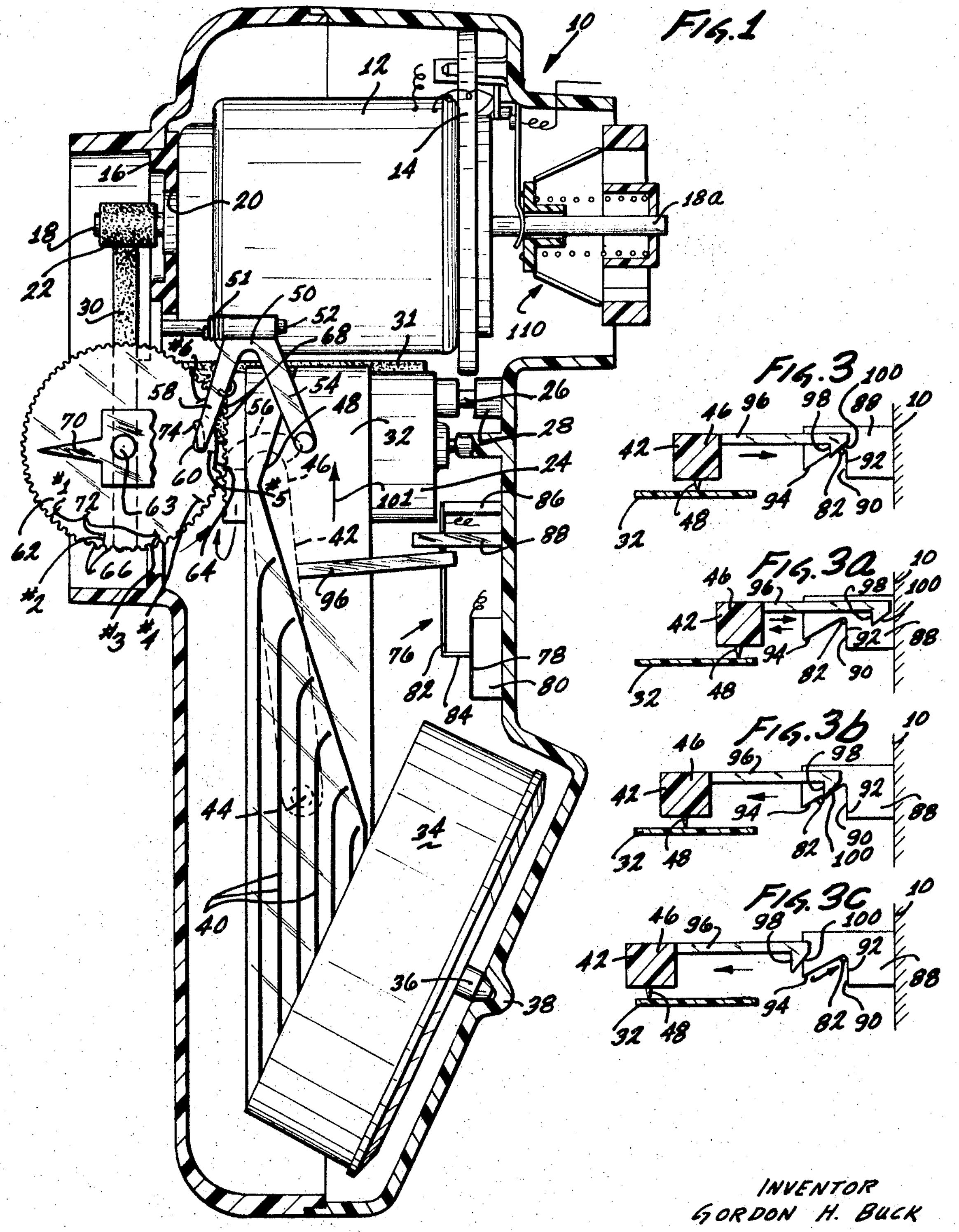
FIG. 1 is a longitudinal cross-sectional view of a sound-translating apparatus according to the present invention.
FIGS. 3 through 3c are sectional views showing sequential operation of the switch means.

Referring now to the drawings and particularly to FIG. 1 there is shown a sound-translating apparatus including a housing 10 having a motor 12 mounted therein by means of plates 14 and 16 secured within housing 10. Motor 12 includes an output shaft 18 protruding through an aperture 20 in plate 16 and carrying a pulley 22 for rotation thereby. A backup roller 24 is rotatably mounted within housing 10 by means of integrally formed bearing pins on housing 10. The axis of rotation of backup roller 24 is generally parallel to output shaft 18. A flanged drive roller 30 is carried by a shaft 26 bearing in housing 10 at bearing 28, which is integral with housing 10, and engages with pulley 22, on motor 12. Roller 30, includes a cylindrical portion 31 bearing on backup roller 24.

A recorded-message carrier means, in the form of a continuous loop tape 32 is fed from a reel 34 and is trained around the backup roller 24 in front of cylindrical portion 31 of roller 30. The reel 34 is rotatably mounted within housing 10 by suitable means, such as tapered shaft 36 inserted in bearing 38 formed by a detent in a wall of housing 10. The threading of the tape 32 and the mounting of the reel 34 are not shown in detail inasmuch as a fuller description is not essential to a complete understanding of the invention.

The tape 32 contains a plurality of parallel, prerecorded, phonograph record sound grooves 40 laterally spaced across the width of tape 32. A tone arm 42 shown in dotted lines is pivotally mounted within housing 10 by means of pivot 44. The free end 46 of tone arm 42 contains a sound pickup means or needle 48 adapted for engaging the grooves 40 in a direction generally perpendicular to the surface of tape 32.

A generally L-shaped lever 50 is pivotally carried by a shaft 52 extending from plate 16 within housing 10, the axis of shaft 52 being generally parallel to the axis of the shaft 18 of motor 12. A first arm 54 of lever 50 abuts against the undersurface of a transversely extending member 56 (see FIG. 5) secured to the free end 46 of tone arm 42. A second arm 58 of lever 50 has a downwardly extending cam follower 60 slidably engaging the surface of an indexing wheel 62.

The indexing wheel 62 is mounted to the housing 10 (in a manner not shown) for rotation about an axis 63 generally perpendicular to the axis of rotation of backup roller 24. Indexing wheel 62 has gear teeth 66 about the periphery thereof except for one sector 64, the wheel 62 being positioned so that the teeth 66 thereof engage gear teeth 68 formed in the periphery of one edge of backup roller 24. Secured to the axis 63 is a pointer 70 which is stationary with respect to the housing 10. The indexing wheel 62 bears a plurality of radial marks 72, the number of marks 72 corresponding to the number of grooves 40 on tape 32 to permit selection of the desired track. A cam segment 74 is provided on the surface of indexing wheel 62 adjacent the toothless sector 64, the cam segment 74 being adapted to engaging cam follower 60 of arm 58 of lever 50. Lever 50 is provided with a hinge spring 51 encircling shaft 52 at one end and engaging arm 58 to urge arm 58 toward the surface of the indexing wheel 62 (see FIG. 5).

A switch mechanism, generally designated 76, is positioned within housing 10 and includes a stationary conductive strip member 78, secured to a boss 80 integral with the wall of housing 10. A spring contact wire 82, which is generally L-shaped, has the free end of the short leg 84 thereof abutting against fixed strip member 78 in its normal position. The long leg of wire 82 is secured to a boss 86 within housing 10. A retaining member 88 extends out from the wall of housing 10, (see FIG. 3) the retaining member having a recess 90 formed by a first edge 92 and an outwardly and downwardly inclined second edge 94, the wire 82 normally resting in the recess 90. The tone arm 42 is provided with a projection 96 secured thereto having a downwardly depending hook portion 98 at the end thereof adapted for selective engagement with wire 82 for urging wire 82 against its bias to withdraw short leg 84 from strip contact member 78. Hook portion 98 is provided with a tapered nose 100 to urge wire 82 downwardly along edge 92 of retaining member 88 prior to engagement of hook portion 98. The operation of the switch mechanism 76 will be discussed in detail hereinafter.

Figure 2:
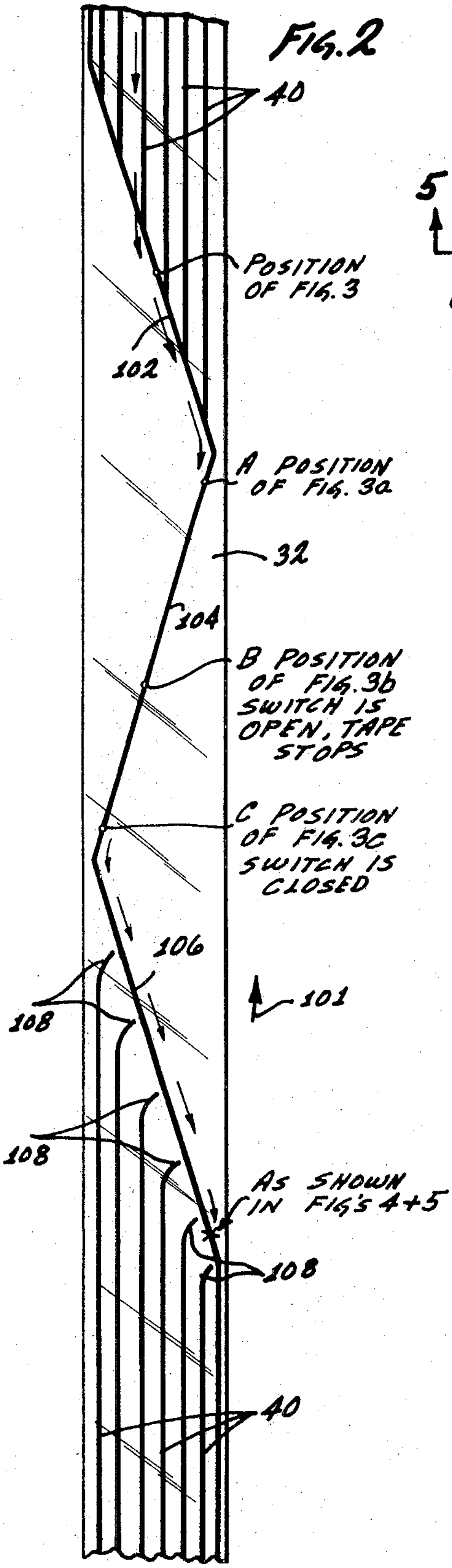
FIG. 2 is a plan view of a segment of the continuous loop tape showing details of the grooves therein.

The position of the grooves 40 in tape 32 is shown in detail in FIG. 2. The direction of travel of tape 32 is indicated by large arrow 101 while the direction of travel of the needle 48 is indicated by the series of small arrows. The grooves 40 are disposed in generally parallel fashion along the length of the tape with the ends of the grooves 40 terminating in a single, silent (unrecorded) runout groove 102 which is disposed angularly from left to right (as viewed in FIG. 2) across the width of tape 32. The groove 102 then has a second continuous silent portion 104 which angularly traverses the width of the tape 32 from right to left, and a third continuous silent groove portion 106 angularly traversing the width of the tape 32 from left to right again. The beginning of each groove 40 is provided with an arcuate lead-in groove 108 which curves clockwise from its respective groove 40 and terminates short of groove portion 106 for reasons which will hereinafter become obvious.

OPERATION OF THE DEVICE

Figure 6:
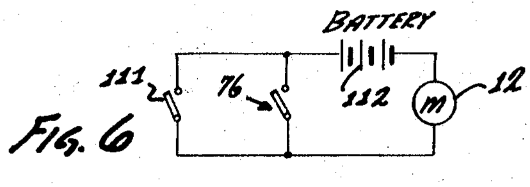
FIG. 6 is a schematic diagram of the circuit of the sound-translating apparatus.

Initially, the electrical circuit is as shown in FIG. 6 with parallel switches 111 and 76 normally opened, either one being adapted for electrically connecting power source 112 to motor 12. The needle 48 of tone arm 42 is resting in runout groove portion 104 at the position designated B in FIG. 2. The switch mechanism 76 for position B is shown in FIG. 3*b* with wire 82 pulled out of engagement with strip member 78. A particular groove 40 is selected by rotation of indexing wheel 62 until the desired mark 72 is aligned with pointer 70. The backup roller 24 is loosely mounted within the housing 10 in such a manner that rotation of indexing wheel 62 rotates roller 24 which is loosely associated with tape 32 and does not move the tape 32 during this selection .

The cam segment 74 is thus prepositioned a given circumferential distance from cam follower 60 on arm 58 of lever 50. Switch 111, which is a momentarily actuated spring-return switch, is depressed for a short interval. This completes a circuit through switch 111 and power source 112 to operate motor 12. Backup roller 24 is rotated by roller portion 31 to start tape 32 moving in the direction shown by the large arrow 101. Gear teeth 68 on roller 24 engage gear teeth 66 on indexing wheel 62 causing it to rotate counterclockwise.

During this short interval the relative position of the needle 48 with respect to tape 32 has changed from position B to position C in FIG. 2. As seen in FIG. 3*c*, the tone arm 42 has traveled laterally to the left edge of tape 32. Hook portion 98 of projection 96 secured to tone arm 42 has released spring wire contact 82 thereby urging short leg 84 into electrical contact with strip contact member 78 to close the switch 76 in FIG. 6 to maintain energization of motor 12 during the operational cycle.

Figure 4:
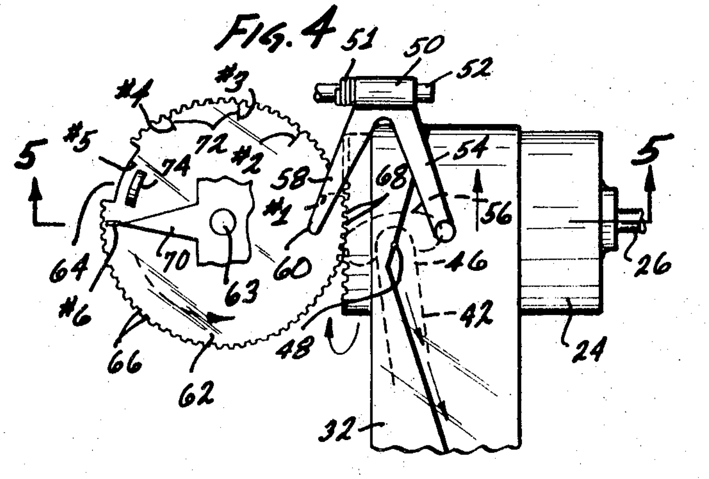
FIG. 4 is a plan view of the indexing mechanism with the indexing wheel shown in a position different from FIG. 1.

As shown in FIG. 4, track 06 has been selected, this corresponding to cam segment 74 being displaced the greatest circumferential distance from cam follower 60 when six grooves 40 are on the tape 32. As the indexing wheel 62 rotates, the needle 48 is traveling from left to right across the width of the tape 32 in runout groove portion 106 and the sequential positioning of the switch mechanism 76 is as shown in FIGS. 3 and 3*a*.

Figure 5:
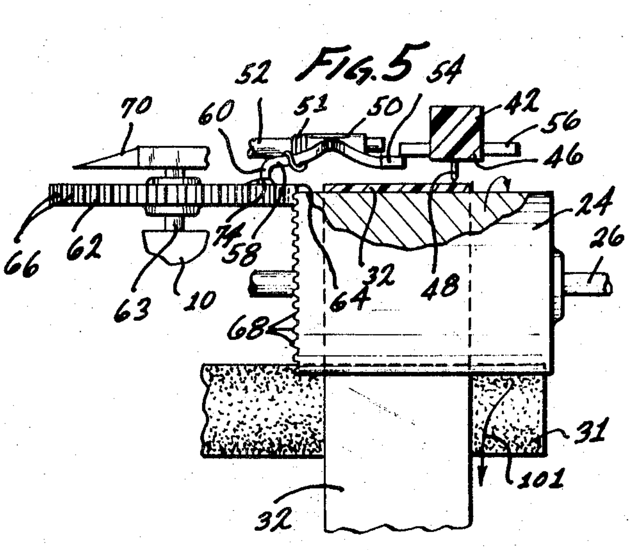
FIG. 5 is a partially sectioned view taken along line 5–5 of FIG. 4.

As the cam segment 74 approaches cam follower 60 of lever arm 58, the needle 48 approaches a lateral position on the tape 32 corresponding to groove 06, as shown in FIG. 5. The cam segment 74 engages cam follower 60 to raise lever 50. Lever arm 54 engages the undersurface of transversely extending member 56 secured to free end 46 of tone arm 42 interrupting further lateral movement of tone arm 42. The tape 32 continues its travel, the cam segment 74 passes beyond cam follower 60 and the tone arm 42 and needle 48 drop onto the tape 32 somewhere within the arcuate lead-in groove 108 for 06 groove to begin reproducing the sound on that particular groove 40 through the needle 48 and a speaker (not shown) of the type disclosed in said copending application Ser. No. 699,653, now U.S. Pat. No. 3,482,842. The toothless sector 64 of indexing wheel 62 is positioned contiguous to gear teeth 68 of backup roller 24 causing wheel 62 to be out of engagement with roller 24 to prevent further rotation of cam segment 74.

At the termination of travel of the needle 48 in groove 40 the needle enters runout groove 102 to position A in FIG. 2. This corresponds to FIG. 3*a* where the tone arm 42 and needle 48 are adjacent the right edge of tape 32. Contact wire member 82 is resting in recess 90 of retaining member 88 while hook portion 98 is near its extreme travel well beyond wire member 88. As the needle 48 traverses portion 104 of runout groove 102 the tone arm 42 travels laterally to the left until at position B the switch 76 is opened and the motor 12 deenergized. Viewing FIGS. 3*b* and 3*c*, as the tone arm 42 travels to the left, the hook portion 98 of projection 96 engages wire member 82 carrying it along inclined edge 94 of retaining member 88 until short leg 84 is out of engagement with fixed contact strip member 78. The device is now in its original state ready for further selection of another sound sequence for reproducing.

The speed of motor 12 may be controlled by a governor means 110 which is of the type disclosed in said copending application, Ser. No. 699,653 now U.S. Pat. No. 3,482,842 and which is mounted on an extension 18*a* of shaft 18.

While there has been shown and described a preferred embodiment it is to be understood that various other adaptations and modifications can be made without departing from the spirit and scope of this invention and no limitations are intended by the details of construction and design herein shown and described other than as defined in the appended claims.

What I claim is:

1. In combination with a sound-translating apparatus including an elongated, recorded message carrier means carrying a plurality of longitudinally extending recorded message means spaced laterally across the width of said carrier means, a sound pickup means adapted to engage any one of said recorded message means and drive means for moving said carrier means linearly indexing means for selecting a predetermined one of said recorded message means, comprising:
   means for moving said sound pickup means laterally across the width of said carrier means in timed relation to linear movement thereof;
   rotatable means driven by said drive means for arresting lateral movement of said pickup means at an area corresponding to the lateral location of said predetermined recorded message means; and
   engaging means for bringing said pickup means into engagement with said recorded message means at said area.

2. A combination as stated in claim 1 wherein said moving means comprises a lead-in groove extending diagonally across said carrier means, said pickup means being engageable in said groove for said diagonal movement therein when said carrier means is moved linearly.

3. A combination as stated in claim 2 wherein said arresting means comprises means for lifting said pickup means out of said lead-in groove at said area.

4. A combination as stated in claim 3 wherein said engaging means comprises means for releasing said pickup means after it has been lifted.

5. A combination as stated in claim 4 wherein said means for moving said carrier means linearly includes a drive roller and a backup roller, said drive roller driving said backup roller, said carrier means being trained through the nip of said rollers.

6. A combination as stated in claim 5 wherein said indexing means includes a wheel having a cam provided thereon, said cam comprising said means for lifting said pickup means, means for rotating said wheel to position said cam relatively to said pickup means and means for correlating the rotation of said wheel with the linear movement of said carrier means.

7. A combination as stated in claim 6 wherein said rotating means includes means drivingly connecting said wheel to one of said rollers.

8. Sound-translating apparatus comprising:
   an endless tape having a plurality of spaced, generally parallel, prerecorded grooves traversing the length thereof, except for a predetermined portion thereof, runout groove means provided on said predetermined portion in communication with the terminal ends of said prerecorded grooves, said runout groove means following a defined path having a portion extending across the width of said tape and another portion extending across said tape adjacent the beginning of each of said prerecorded grooves;

phonograph needle means adapted to engage said prerecorded grooves and said runout groove means;

drive means for moving said tape in a predetermined direction; and indexing means driven by said drive means for selecting a desired prerecorded groove, said indexing means being engageable with said phonograph needle means for momentarily lifting it from said another portion of said defined path then releasing the same to permit said needle means to engage said selected prerecorded groove.

9. The combination according to claim 8 wherein said drive means includes rotatable roller means engaging said tape.

10. The combination according to claim 8 wherein said indexing means includes a wheel and means connecting said wheel to said drive means for rotation thereby, said wheel having a cam segment for lifting said needle means after a partial revolution of said wheel, the amount of said partial revolution of said wheel determining said selected prerecorded groove.

11. The combination according to claim 10 wherein said phonograph needle means is carried by a tone arm having limited pivotal movement and wherein said indexing means includes a lever coacting with said cam segment and said tone arm for lifting said needle means.

12. The combination according to claim 11 wherein said drive means includes an electric motor and a normally open first switch means and a normally closed second switch means for connecting said motor to a power source, said tone arm actuating said second switch means to an open position after said needle means traverses a first fixed distance in said runout groove means, said first switch means being momentarily actuated to energize said motor, said tone arm restoring said second switch means to a closed position after said needle means traverses an additional fixed distance in said runout groove means.

13. The combination according to claim 12 wherein said second switch means includes a spring wire contact member and said tone arm is provided with a hooked projection for selectively engaging said spring wire contact member.